United States Patent [19]

Meisenheimer, Jr.

[11] Patent Number: 4,654,643

[45] Date of Patent: Mar. 31, 1987

[54] PRESSURE SENSOR-MONITOR AND EXCESSIVE PRESSURE LEVEL INDICATOR

[76] Inventor: Daniel T. Meisenheimer, Jr., 404 Longmeadow Rd., Orange, Conn. 06477

[21] Appl. No.: 757,367

[22] Filed: Jul. 22, 1985

[51] Int. Cl.$^4$ ............................................. G08B 21/00
[52] U.S. Cl. ..................... 340/626; 24/633; 24/664; 116/266; 116/281; 116/283; 340/566; 340/611; 340/614; 403/290; 403/322
[58] Field of Search ............... 340/611, 614, 626, 658, 340/566; 292/19; 24/633, 662, 664, 677; 116/266, 281, 283, 218; 73/861.47, 651, 492; 403/289, 290, 322

[56] References Cited

U.S. PATENT DOCUMENTS

| 1,955,018 | 4/1934 | Rego ................................. 340/626 X |
| 2,468,768 | 5/1949 | Malick ................................ 340/611 |
| 2,504,381 | 4/1950 | Bordelon ......................... 340/626 X |
| 4,010,708 | 3/1977 | Keledy et al. .................. 116/266 X |
| 4,421,349 | 12/1983 | Greiert, Jr. .......................... 292/19 |

FOREIGN PATENT DOCUMENTS

| 489204 | 12/1952 | Canada ................................ 340/626 |
| 57519 | 6/1939 | Norway ............................... 116/266 |

Primary Examiner—James L. Rowland
Assistant Examiner—Daniel Myer
Attorney, Agent, or Firm—Mattern, Ware, Stoltz & Fressola

[57] ABSTRACT

By providing a pressure responsive actuator in controlled actuating engagement with a latch mechanism in which a spring-loaded indicator is securely retained, with said indicator being movable from a non-visible, retained position to a visible, released position in response to pressure exceeding a desired level, a unique, precision constructed pressure sensor and indicator is achieved. In the preferred embodiment, the latch mechanism comprises a plurality of elongated, resilient, spring-biased locking fingers, with the locking fingers being controllably disengaged from the indicator in response to the movement of the pressure responsive actuator. In addition, the present invention is also quickly and easily manually reset, thereby further enhancing the usability of the present invention.

19 Claims, 7 Drawing Figures

PRESSURE SENSOR-MONITOR AND EXCESSIVE PRESSURE LEVEL INDICATOR

TECHNICAL FIELD

This invention relates to pressure sensors and more particularly to positive and differential pressure sensors providing an easily-seen, visual indication whenever the pressure being sensed exceeds a pre-set level.

BACKGROUND ART

Pressure sensing devices are required and are typically employed in many aerospace and ground vehicle constructions in order to provide constant monitoring of specific pressure levels in various operating components. Typically, a plurality of pressure sensors are required in a particular system in order to properly monitor all important component areas. Due to the plurality of pressure sensors that are used, the sensors typically employ an indicator to show which unit has detected a fault condition. However, in spite of the importance and need for reliable pressure sensors of this nature, reliable pressure sensors are not obtainable.

Common problems typically encountered with prior art pressure sensors are their inability to withstand severe environmental conditions, and their repeated false readings whenever the system is exposed to conditions of shock or vibration. Since most prior art sensors employ magnetic release systems, failures often occur due to exposure to shock or vibration, exposure to direct or induced magnetic fields, or changes in magnetic decay time characteristics. In addition, although increased sensitivity has long been desired by consumers, prior art systems have been unable to provide a reliable sensor while still attaining the level of sensitivity sought by the consumer.

Therefore, it is a principal object of the present invention to provide a pressure sensor which is capable of providing a highly sensitive and reliable system having complete repeatability with virtually no false readings being produced.

Another object of the present invention is to provide a pressure sensor having the characteristic features described above that is also rugged in construction, capable of resisting all adverse environmental conditions, while also being capable of withstanding shock and vibration levels encountered in typical use.

Another object of the present invention is to provide a pressure sensor having the characteristic features described above which is capable of simultaneously producing both visual indication and electrical switching repeatedly and reliably, each and every time the pre-set pressure threshold level has been exceeded.

Other and more specific objects will in part be obvious and will in part appear hereinafter.

SUMMARY OF THE INVENTION

The pressure sensor of the present invention is capable of eliminating all of the prior art difficulties and drawbacks by incorporating a positive, mechanical, indicator-holding latch mechanism in combination with a pressure responsive actuator as the key elements for attaining the desired combined precision pressure sensing and indicating assembly. In this way, the prior art difficulties typically encountered with undependable magnetic release systems are totally avoided.

In the present invention, a plurality of spring biased fingers are lockingly engaged with a spring loaded, axially movable indicator. The indicator securing locking fingers are controllably biasingly deflected out of locking engagement with the indicator in response to the pressure level being monitored exceeding the pre-set threshold.

In addition, the sensor of this invention is equally effective as a temperature sensor, mechanical motion sensor, or vibration frequency sensor. Although this disclosure details the construction and operation of the sensor as a pressure sensor, these alternate embodiments are equally applicable and considered to be within the scope of the present invention.

In the preferred construction, the pressure responsive actuator comprises an elongated arm which is interconnected with a pressure sensing diaphragm and axially movable in response to movement of the diaphragm. The diaphragm is exposed to the pressure being sensed and moves in response to changes in the pressure. The movement of the diaphragm versus pressure applied is adjustable, and the diaphragm is spring-loaded. Preferably, the pressure responsive movement of the diaphragm is pre-set to precisely correspond to the pressure level being monitored, with the particularly desired threshold pressure level to be sensed being pre-set for the appropriate deflection of the diaphragm with its interconnected actuating arm to assure that the arm contacts the locking fingers to disengage the fingers from locked engagement with the indicator at the precisely desired pressure level.

In operation, the diaphragm and its associated actuating arm freely move within the pressure range representing the normal operational tolerances for the pressure source being monitored. However, as soon as the pressure range is exceeded, the diaphragm moves into a position which causes the actuating arm to biasingly deflect the locking fingers out of holding engagement with the indicator. Once the locking fingers disengage from the indicator, the spring-biased indicator moves axially from its first, non-indicating position into its second fault-indicating position.

In the preferred embodiment, the indicator also cooperates with switch means which are actuated when the indicator moves from its first locked position to its second fault-indicating position. The switch means is constructed to complete an electrical contact which causes illumination or other signal in a remote location, thereby informing the operator or system that a fault condition has been sensed.

Typical installations using pressure sensors usually require a plurality of sensors. By using indicators in the sensor, the operator can quickly identify the particular sensor which has been activated, since the indicator is in its second, visible position. Once the sensor has been identified, the operator knows the exact location of the trouble area, corrects the problem, and reactivates the sensor by merely manually re-setting the indicator. In the present invention, the sensor is quickly and easily re-set by reducing the pressure and pressing the indicator against its cooperating biasing spring until the indicator is returned into locked engagement with the holding fingers. Once reactivated, the sensor is ready to continue its monitoring operation.

The pressure sensor of this invention is constructed for close tolerance, precision monitoring of both the positive and differential pressure levels. In monitoring differential pressures, the sensor incorporates two pressure inlet ports, with one port connected to the higher pressure source and the other port connected to the lower pressure source. The monitoring ports are positioned on opposite sides of the diaphragm, so that the diaphragm is exposed to and moves in response to the differential pressure between these two inputs. In addition, the movement of the diaphragm is quickly and easily adjusted to the particular pressure range desired, while also assuring that the desired excessive pressure indication is produced each and every time the pre-set pressure level threshold is exceeded.

A further feature of the pressure sensor of this invention is its universal applicability. The sensor of this invention provides precise pressure sensing through a broad pre-selected range, while also providing a readily accessible, manually resettable, positive visual indication, as well as a simultaneous remote electronic or electrical signal, each and every time the pressure level being sensed exceeds the pre-set threshold. In addition, depending upon the particular construction employed, the pressure sensor of this invention monitors positive pressures and differential pressures. As a result, the pressure sensor of the present invention can be employed in virtually all systems in which pressure or vacuum is to be monitored, regardless of the requirement of the particular system. This includes monitoring fluid pressure levels in a liquid filled system, as well as monitoring temperature changes by differential expansion.

The pressure sensor of the present invention is preferably constructed as a complete, environmentally sealed unit, in order to assure dependable, reliable long-term operation under a wide variety of adverse conditions. In addition, the pressure sensor of the present invention is constructed in a manner which is resistant to shock and vibration loads which are often encountered by pressure sensing devices and which, heretofore, have caused such prior art systems to produce erroneous and inaccurate results.

As part of this environmental sealing and vibrating resistance, the visual indicator of the pressure sensor is preferably housed in a container having a terminating end portion formed by an impact resistant and temperature resistant transparent dome. By positioning the dome in cooperating alignment with the indicator, the indicator becomes immediately visible every time the indicator moves into the second, fault detecting position.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the present invention, reference should be made to the following detailed description taken in connection with the accompanying drawings, in which.

DETAILED DESCRIPTION

Figure 1:
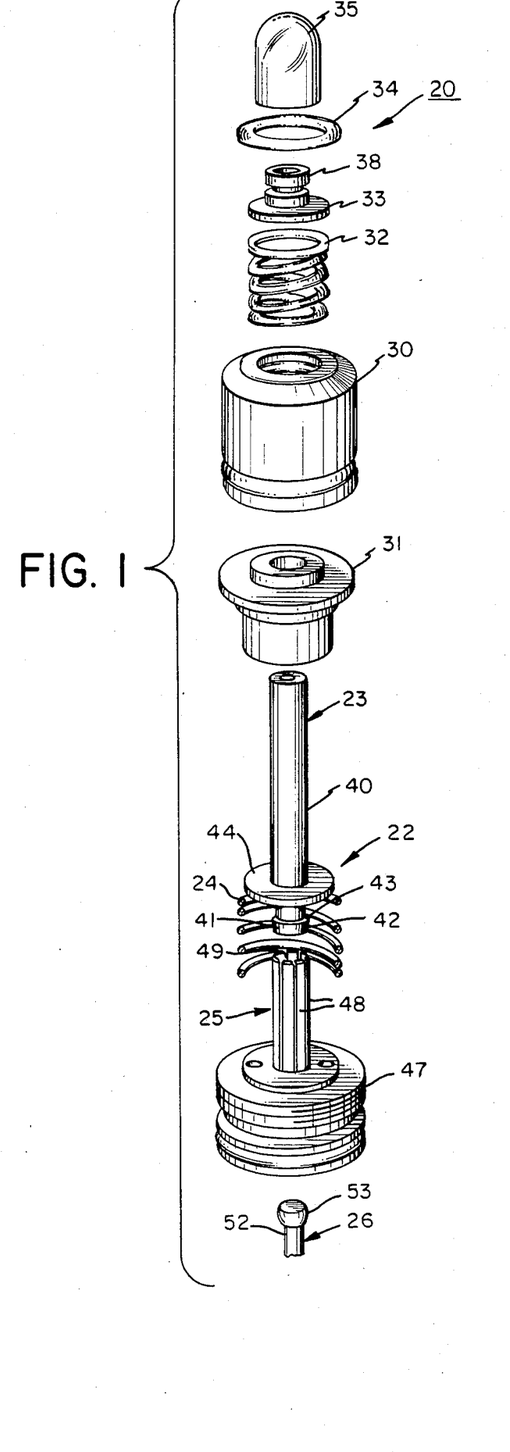
FIG. 1 is an exploded perspective view of a major portion of the pressure sensor and indicator assembly of the present invention.

In FIG. 1, an exploded perspective view of the major components forming pressure sensor 20 of the present invention is shown. In particular, pressure responsive monitoring and indicating sub-assembly 22 incorporates an axially-movable indicator 23, an indicator biasing spring 24, latch means 25, and an actuator 26.

In order to enhance and assure the repeatable, trouble-free, continuous operation of pressure responsive monitoring and indicating subassembly 22, the preferred construction of pressure sensor 20 also incorporates a housing 30, an indicator guide and spring support bushing 31 mountable to the base of housing 30, a coil spring 32 mountable within housing 30 with one end thereof engaging bushing 31, a dome supporting plate 33 movably mounted within housing 30 with the lower surface thereof in supporting contact with the opposed end of spring 32, a sealing ring 34 mountable within housings 30 to provide the desired environmental sealing, and a transparent dome 35 securely mounted in fixed engagement to plate 33.

Transparent dome 35 and dome supporting plate 33 preferably comprise an independent subassembly with transparent dome 35 securely affixed about its interior surface to post portion 38 of plate 33. In addition, dome 35 preferably comprises a unitary glass member formed from temperature resistant glass, such as Pyrex glass, which is then permanently bonded to upstanding post 38 of support plate 33. In this way, a completely sealed, environmentally safe subassembly is achieved which assures clear visibility of the indicator whenever the indicator has been activated into its visible position.

By employing the unique combination of temperature resistant glass, environmentally sealed to a support base, continuous, trouble-free operation with crisp, clear visibility of any indicator contained therein is assured, since no degradation of transparent dome 35 occurs. Furthermore, by employing rugged, transparent glass dome 35 in combination with support plate 33, a dependable rigid plunger member is also achieved which is quickly and easily employed to move indicator 23 from its visible second position back to its engaged and locked first position, when desired.

In the preferred construction, indicator 23 incorporates an elongated, substantially cylindrically shaped rod portion 40, terminating at one end with a radially extending tapered flange 41, which peripherally surrounds the terminating end of rod 40. In the preferred construction, flange 41 comprises an inwardly sloping, tapered sidewall 41 terminating at one end with the substantially flat ledge 43, with ledge 43 being substantially perpendicular to the central axis of rod 40.

Figure 2:
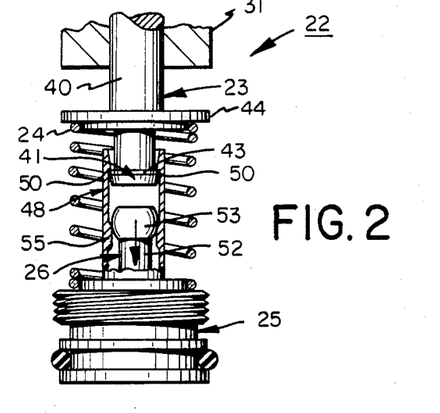
FIG. 2 is an elevation view, partially in cross-section, and partially broken away, showing the major components of the pressure sensor and indicator of the present invention in the finger engaged, indicator rod locked position.
Figure 3:
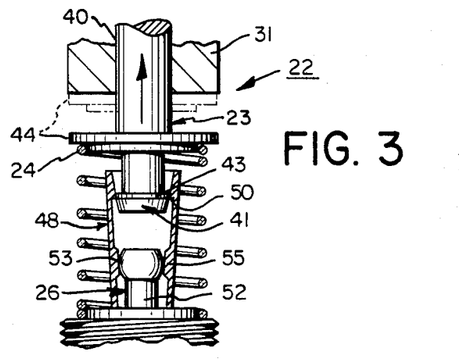
FIG. 3 is an elevation view, partially in cross-section and partially broken away, of the assembly's pressure sensor and indicator of the present invention shown in the finger disengaged, rod unlocked position.

In addition, indicator 23 also incorporates a spring engaging plate 44 which peripherally surrounds rod portion 40, radially extending outwardly therefrom, with a diameter substantially greater than rod 40. As shown in FIGS. 1-3, plate 44 overlies and is in contacting engagement with one end of coil spring 24. As fully detailed below, this construction provides the desired movement of indicator 23 from its first position to its second position, when indicator 23 has been disengaged from its locked engagement with latch means 25.

In the preferred embodiment, latch means 25 incorporates a base 47 and a plurality of upstanding resiliently movable locking fingers 48. Each upstanding finger 48 comprises one free end and is securely affixed at its opposed end to base 47. Consequently, each finger 48 is in a fixed upstanding position, capable of being resiliently deflected out of its normal position by a flexing force, while resiliently returning to its original position when the flexing force is removed.

In addition, each locking finger 48 incorporates a holding shoulder 50 which extends substantially perpendicularly from a side surface of finger 48, adjacent to the free end of finger 48. Each shoulder 50 cooperatingly engages with ledge 43 of indicator 23 to securely hold indicator 23 in secure locked interengagement with latch means 25.

In the preferred construction, the plurality of upstanding fingers 48 are positioned in a substantially cylindrical arrangement, defining a latch entry zone 49. In this way, when indicator 23 is to be securely latchingly engaged with latch means 25, sloping sidewall 42 of tapered flange 41 of indicator 23 is advanced into latch entry zone 49 until the shoulders 50 of fingers 48 securely interconnect and overlyingly engage ledge 43 of flange 41.

In achieving this interconnected, locked, holding engagement, fingers 48 are biased outwardly by tapered flange 41 until ledge 43 has passed beyond shoulders 50 of fingers 48. Once ledge 43 of flange 41 passes beyond shoulders 50, the inherent spring force of fingers 48 cause each of the fingers to return to their original position, securely locking indicator 23 in the desired position.

As discussed above, the preferred embodiment of sensor 20 incorporates a spring 24. Consequently, prior to lockingly engaging indicator 23 with latch means 25, coil spring 24 is placed in position between base 47 and plate 44 of indicator 23. In addition, since coil spring 24 is constructed to be in compression when indicator 23 is in latched engagement with fingers 48, coil spring 24 exerts its spring force on plate 44 of indicator 23 in an attempt to push indicator 23 out of engagement with latch means 25.

Actuator 26 comprises an elongated rod 52 terminating at one end with an enlarged finger-engaging cam surface 53. The opposed end of actuator 26 is connected to pressure responsive means which cause actuator 26 to move axially in response to changes in the pressure being monitored. As is more fully detailed below, actuator 26 is mounted within a receiving hole formed along the central axis of latch means 25. In addition, actuator 26 is positioned with its cam surface 53 in juxtaposed, spaced, controlling relationship to fingers 48.

Changes in the pressure being monitored cause actuator 26 to move axially within latch means 25. As soon as the pressure being monitored exceeds the pre-set threshold level, actuator 26 simultaneously biasingly deflects fingers 48 outwardly from their normal position, disengaging shoulders 50 of fingers 48 from locked securement of indicator 23. Once fingers 48 have been moved out of locked holding engagement of indicator 23, indicator 23 is free to move from its first position to its second position, in response to the force exerted by coil spring 24. This spring force causes indicator 23 to move into its second position, wherein a fault condition has been sensed and the indication thereof is provided by rod portion 40 of indicator 23 clearly appearing in dome 35.

In FIG. 2, pressure responsive monitoring and indicating subassembly 22 is shown with indicator 23 retained in its locked, first position. When indicator 23 is in its securely locked first position, ledge 43 of flange 41 is in abutting, contacting engagement with the plurality of cooperating holding shoulders 50 formed on upstanding finger members 48.

When in this locked position, each shoulder 50 of each finger member 48 is in overlying secure abutting engagement with a portion of ledge 43 of flange 41 of indicator 23, with spring 24 in compression. In this way, a constant force is maintained on indicator 23 in an attempt to push indicator 23 out of engagement with fingers 48, while also maintaining the abutting, contacting surfaces of finger members 48 and indicator 23 in locked engagement.

Figure 4:
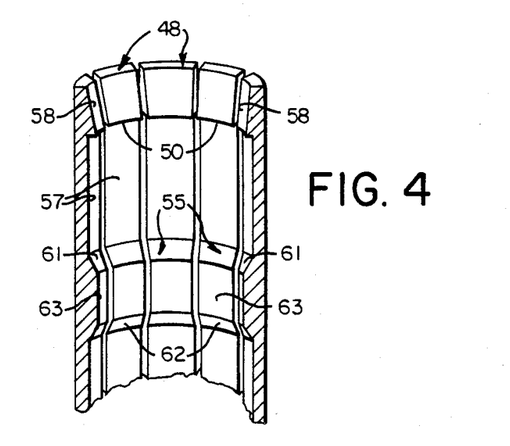
FIG. 4 is a perspective view, partially in cross-section and partially broken away, showing the preferred embodiment of the plurality of locking fingers showing a part of the present invention.

When fully assembled, actuator 26 is mounted within latch means 25, with cam surface 53 thereof longitudinally movable within the substantially cylindrical shape formed by upstanding finger members 48. As shown in FIGS. 2-4, each upstanding locking finger 48 incorporates a cam follower ramp surface 55 extending from one side surface thereof, positioned for cooperating, engagement with cam surface 53 of actuator 26.

As shown in FIG. 2, when indicator 23 is in its locked position, cam surface 53 of actuator 26 is positioned in adjacent, cooperating relationship to cam follow ramp surfaces 55 of finger members 48. During normal monitoring operation, actuator 26 moves longitudinally within the substantially cylindrical zone defined by finger members 48, with cam surface 53 remaining either adjacent or in touching non-camming contact with cam follower ramp surfaces 55.

However, whenever the pressure being monitored exceeds the pre-set threshold limit, actuator 26 moves longitudinally a sufficient distance to cause camming surface 53 of actuator 26 to advance into direct, controlled, camming engagement with cam follower ramp surfaces 55 of finger members 48, forcing each of the plurality of finger members 48 to be resiliently deflected outwardly.

This outward deflection of finger members 48 also causes locking shoulders 50 of finger members 48 to be disengaged from ledge 43 of tapered flange 41 of indicator 23. Once the locking engagement of the plurality of shoulders 50 with ledge 43 is effected, indicator 23 is free to move in response to the compression force of spring 24, causing cylindrical portion 40 to move axially into its second, fault indicating position. This second position is shown in phantom in FIG. 3.

As is readily apparent from the preceding description, the combined pressure sensing and indicating subassembly 22 achieves efficient, dependable, precision, trouble-free monitoring of desired pressure levels with fast, accurate actuation and indicating of a fault condition whenever the desired threshold level has been exceeded. As is further detailed below and as will be apparent from this disclosure, many variations of the present invention can be made. However, all of the alternate embodiments and apparent expedients are intended to be within the scope of this invention.

In FIG. 4, an enlarged detailed view of a plurality of locking finger members 48 are shown. By referring to FIG. 4, along with the following detailed disclosure, the preferred construction as well as alternate configurations for locking fingers 48 of the present invention can best be understood.

In the preferred embodiment, the plurality of locking fingers 48 are arranged in substantially cylindrical configuration. If desired, alternative shapes as well as open zones could be used with equal efficacy. The only requirement would be that cam surface 53 of actuator 26 must have a cooperating configuration in order to obtain the desired pressure responsive deflection of finger members 48.

Furthermore, the plurality of locking fingers 48 may comprise any desired number. In the preferred embodiment, eight fingers are employed to form the cylindrically-shaped locking zone. In addition, in the preferred embodiment, each finger 48 is formed with a slight dimensional difference from the other finger members. In this way, the present invention substantially eliminates potential failures or false pressure indications due to vibration or shock.

As discussed above, prior art systems are generally susceptible to vibration and shock causing prior art pressure sensors to frequently suffer false activation. However, in the present invention, each of the locking fingers 48 is preferably formed with a different dimension from the other associated finger members. In this way, each finger member has a harmonic or resonant frequency which is unique to that particular finger member only and is different from the other finger members. As a result, each finger member responds to vibration and shock in a different manner from the companion finger members.

Although one of the finger members in a particular octandrious configuration may become disengaged from ledge 43 of indicator 23 in response to a particular vibration, all eight finger members do not have identical frequency responses and would not be dis-engaged from actuator 23 at the same time. Consequently, vibration, as well as shock conditions are resisted and virtually eliminated as a possible error producing cause.

In an alternate embodiment of the present invention, a vibration sensitive and pressure sensitive sensor can be attained. In this embodiment, all of the finger members 48 would be identical in construction, with that construction being made to specifically respond to a pre-selected vibratory frequency. Consequently, whenever the sensor is exposed to that particular frequency, all of the finger members would move simultaneously, thereby releasing the indicator. Since the sensor would also be responsive to the pressure levels being monitored, a sensor is attained to monitor both pressure and vibration frequencies.

By referring to FIG. 4, the preferred embodiment of finger members 48 can best be seen. In this preferred construction, each finger member 48 incorporates a ledge engaging shoulder 50 which extends substantially perpendicularly from elongated inwardly facing surface 57 of finger member 48. In addition, a tapered sidewall 58 extends from shoulder 50 to the free terminating end of finger member 48.

Tapered sidewalls 58 of the finger members 48 cooperate to define latch entry zone 49, shown in FIG. 1. Preferably, tapered sidewalls 58 are constructed with a sloping angle complementary to tapered flange 41 of indicator 23 in order to assure the easy sliding interengagement of tapered flange 41 into latch entry zone 49 and the camming locking advance of tapered flange 41 with flexible finger members 48.

As shown in FIG. 4, cam follower ramp surface 55 of each flexible finger member 48 preferably comprises two oppositely sloping inclined ramp portions 61 and 62 and an interconnecting substantially flat platform surface 63 which extends between and interconnects inclined ramp portions 61 and 62. Although cam follower ramp surface 55 may comprise various alternative constructions, such as a smoothly rounded configuration, the full, oppositely sloping ramp portions 61 and 62 with a substantially flat platform surface 63 extending therebetween is the preferred configuration. In this way, it has been found that the maximum resilient deflection of each flexible finger member 48 can be best controlled while also assuring the desired precision release of the indicator at the desired threshold pressure level.

By employing flat platform surface 63 to define the maximum deflection of finger member 48 out of its normal plane of operation, the possible minor variations which may exist among the plurality of finger members 48 due to manufacturing tolerances are accommodated, while completely eliminating any possibility that one finger member 48 could re-engage with the indicator prior to having all of the other finger members disengaged therefrom. Consequently, the efficient, precision, reliable operation of the pressure sensor of the present invention is further enhanced and assured.

Figure 5:
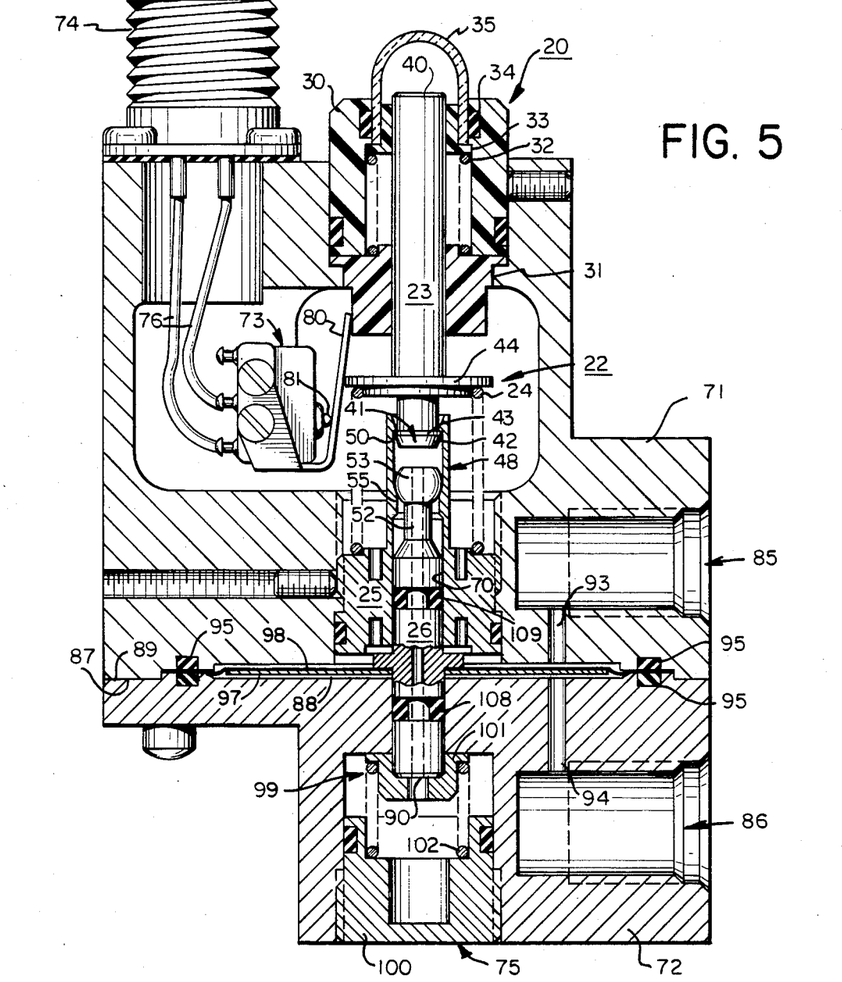
FIG. 5 is a cross-sectional elevation view showing a completely assembled differential pressure sensor and indicator system in accordance with the present invention.

In FIG. 5, pressure sensor 20 of the present invention is shown completely assembled in one of its embodiments. In this embodiment, pressure sensor 20 comprises a fully assembled differential pressure sensor depicted in its pressure monitoring mode with indicator 23 in secured, latched engagement with latch means 25. In addition, actuator 26 is securely retained within elongated channel 70 which is formed preferably along the central axis of latch means 25. As detailed above, cam surface 53 of actuator 26 is positioned in cooperating, juxtaposed relationship with cam follower ramp surface 55 of flexible finger members 48.

The pressure responsive monitoring and indicating subassembly 22 along with the cooperating components detailed above are depicted in FIG. 5 in their fully assembled cooperating positions. In this embodiment, these components are supportingly housed and interengaged in an upper housing 71 and a lower housing 72.

In order to monitor the desired differential pressure, upper housing 71 incorporates a pressure inlet portal 85, while lower housing 72 incorporates a similar pressure inlet portal 86. Preferably, portal 85 is connected to the high pressure line, while portal 86 is connected to the low pressure line.

Figure 6:
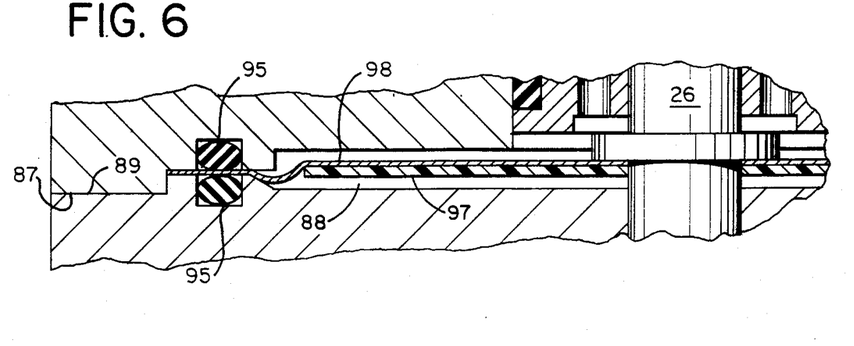
FIG. 6 is an enlarged cross-sectional elevation view of a portion of the differential pressure sensor and indicator system of FIG. 5, partially broken away, depicting the pressure responsive diaphragm in its holding zone.

Housing 71 also incorporates a lower housing mating surface 87, while lower housing 72 incorporates an upper housing mating surface 89. In addition, as shown in FIGS. 5 and 6, surface 87 of upper housing 71 and surface 89 of lower housing 72 incorporate aligned cavities which co-operate to form a completely sealed diaphragm holding and retaining zone 88 when surfaces 87 and 89 are securely matingly interconnected with each other.

Upper housing 71 also incorporates a channel 93 extending between high pressure portal 85 and diaphragm holding zone 88. Similarly, lower housing 72 incorporates interconnecting channel 94 extending between low pressure portal 86 and diaphragm holding zone 88.

As detailed above, when lower housing 72 is matingly securely mounted to upper housing 71, diaphragm holding zone 88 is formed therebetween. In addition, O-ring sealing means 95 are mounted in both upper housing 71 and lower housing 72 and positioned for mating cooperating sealing interengagement in order to assure that diaphragm holding zone 88 is completely sealed. This pressure-tight, leak-free sealed zone is further enhanced by mounting O-ring seal means 108 and 109 along actuator 26, thereby preventing leakage into lower housing 72 or upper housing 71. In this way, accurate sampling and monitoring of the pressure levels exposed to diaphragm holding zone 88 is assured.

In order to provide the desired differential pressure monitoring, actuator 26 incorporates a diaphragm 98 securely mounted thereto and radially extending therefrom. Diaphragm 98 is positioned and securely retained in diaphragm holding zone 88 with the terminating ends of diaphragm 98 being sandwiched between O-ring sealing means 95. With only the outer peripheral edge of diaphragm 98 securely retained between upper housing 71 and lower housing 72, actuator 26 is axially movable along latch means 25, within the limits of diaphragm holding zone 88, in response to the differential pressure exerted upon diaphragm 98 by pressures connected to portals 85 and 86. As detailed below, the pressure responsive axial movement of actuator 26 provides the desired control and pressure sensing for this embodiment of differential pressure sensor 20.

With diaphragm 98 secured in position between upper housing 71 and lower housing 72, diaphragm holding zone 88 is formed as a completely sealed pressure responsive sensing and monitoring zone. In this sealed zone, the top surface of diaphragm 98 is exposed to the high pressure level to which portal 85 and interconnecting channel 93 are exposed, while the lower surface of diaphragm 98 is exposed to the lower pressure being sensed by portal 86 and interconnecting channel 94. In this way, once the requisite adjustable pressure balance has been made, diaphragm 98 is free to move within holding zone 88 in response to changes in the differential pressure resulting from changes in either the high pressure or the low pressure.

With this arrangement, diaphragm 98 continuously monitors changes in both the high pressure source and low pressure source, assuring that the differential pressure resulting from these two sources remains within the pre-set threshold limits imposed upon actuator 26. In the embodiment shown in FIG. 5, whenever the differential pressure exceeds the desired threshold limit, diaphragm 98 is forced towards lower housing 72. This movement causes cam surface 53 of actuator 26 to move into camming engagement with cam follower ramp surfaces 55 of fingers 48, biasingly deflecting fingers 48 outwardly, releasing indicator 23 to show that a fault condition has been sensed.

In order for differential pressure sensor 20 of this embodiment to provide the desired monitoring of pressure changes, actuator 26 and its associated diaphragm 98 must be properly adjusted. To attain this adjustment, pressure threshold level adjustment means 75 is employed.

As shown in FIG. 5, pressure threshold level adjustment means 75 is mounted in a partially threaded receiving hole 99 formed in lower housing 72. Pressure threshold level adjustment means 75 comprises a plug 100 which is threadedly mounted in receiving hole 99, and is axially movable along the central axis of hole 99. In addition, an actuator contacting boss 101 is mounted at the base of hole 99 with spring means 102 biasingly extending between plug 100 and actuator contacting boss 101.

With this construction, the force acting upon lower end 90 of actuator 26 is quickly and easily controllably adjusted. By rotationally advancing plug 100 inwardly into hole 99, spring 102 is compressed, thereby exerting additional force on boss 101 and the lower end 98 of actuator 26 with which boss 101 is engaged.

Similarly, by rotating plug 100 outwardly from receiving hole 99 of lower housing 72, the biasing spring force exerted by spring 102 on boss 101 is reduced, simultaneously reducing the force acting upon lower end 90 of actuator 26. By reducing the spring force, the sensitivity of diaphragm 98 to lower pressure changes is increased, thereby causing actuator 26 to move in response to lower differential pressure changes.

The construction of pressure sensor 20 of this embodiment is completed by incorporating switch means 73 and a pin connector 74 which is electrically interconnected to switch means 73 by wire means 76. As shown in FIG. 5, switch means 73 incorporates a movable lever 80 which is maintained in contact with switch control pin 81 of switch means 73. Preferably, lever 80 is also mechanically grounded against stop 31, in order to protect against unwanted actuation of the switch means due to vibration.

In the preferred construction, lever 80 is affixed at one end thereto to switch means 73, with the other end free to arcuately move in response to the movement of plate 44 of actuator 23. With this construction, switch means 73 is in the OFF mode when actuator 23 is in its securely retained position with latch means 25. However, whenever indicator 23 has been released from latch means 25 and moves axially into its second, indicating position against stop 31, the movement of plate 44 of indicator 23 causes lever 80 to arcuately pivot toward switch means 73, causing pin 81 to move into its ON position, activating switch means 73.

The activation of switch means 73 causes a signal to be transmitted along wire 76 to connector 74. Since a remote signal transmitting means is securely engaged to connector 74, a remote indication that a fault condition has been sensed is simultaneously provided.

In order to further assure and enhance the trouble-free differential pressure sensing and monitoring attained by sensor 20 of this invention, actuator 26 and indicator 23 preferably comprise hollow members with the terminating ends thereof incorporating holes or apertures. In addition, boss 101 of pressure level adjustment means 75 also incorporates a central aperture formed therein. In this way, the pressure level exposed to the cooperating components which monitor and control the actuation of pressure sensor 20 are maintained at the same level, typically atmospheric pressure. As a result, pressure pockets within the pressure sensor 20 are avoided, further assuring and enhancing the trouble free, continuous, accurate monitoring desired for pressure sensor 20.

By employing the pressure sensor 20 of the present invention, it has been found that differential pressures ranging between about two and thirty p.s.i.d. can be efficiently and effectively monitored to provide the desired repeatable, accurate pressure sensing and monitoring. Although the construction of the present invention can be varied, without departing from the scope of this invention, it has been found that differential pressure sensor 20 depicted in FIG. 5 operates most efficiently by constructing actuator 26 to have a movement of between about 0.006 inches and 0.012 inches with diaphragm 98 having a total deflection of about 0.018 to 0.020 inches. In this way, the desired actuation of fingers 48 is achieved most efficaciously.

By employing this level of travel sensitivity, coupled with the pressure level adjustment means 75 detailed above, the desired differential pressure sensing over most realistically required ranges is attained. As a result, the long sought and previously unattainable accurate, repeatable, reliable differential pressure sensor is achieved.

Figure 7:
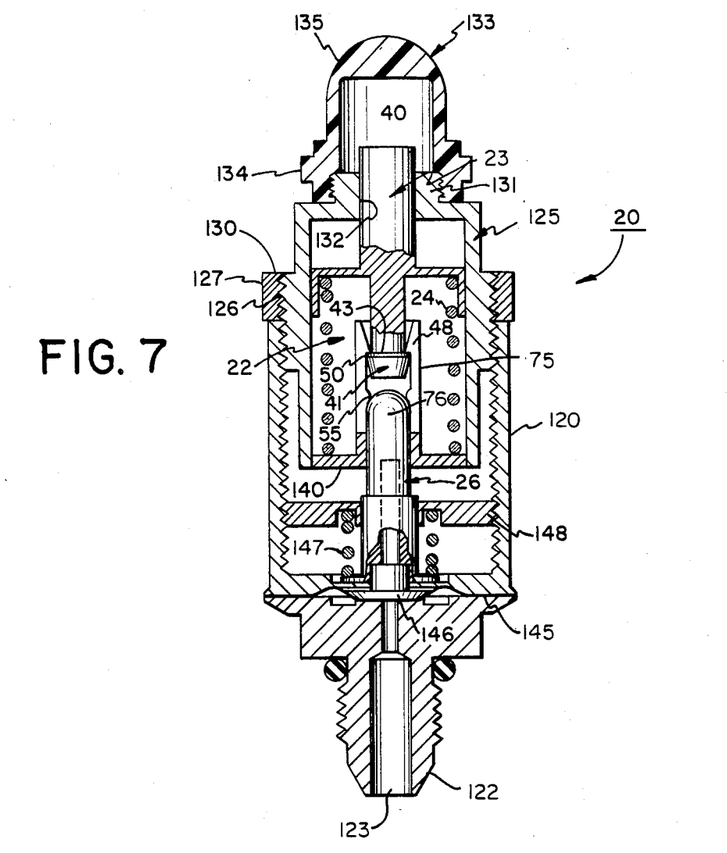
FIG. 7 is a cross-sectional elevation view of an alternate embodiment for a pressure sensor and indicator system in accordance with this invention.

In FIG. 7, an alternate embodiment for pressure sensor of the present invention is depicted. In this embodiment, pressure sensor 20 is constructed for monitoring a single pressure source and providing the desired visual indication whenever that pressure source exceeds a pre-set threshold level.

In this embodiment, pressure sensor 20 incorporates a combined pressure sensing indicating subassembly 22 consisting essentially of indicator 23, spring 24, latch means 25 and actuator 26. In addition, pressure sensor 20 of this embodiment also incorporates a substantially cylindrically shaped housing 120 which is threaded substantially along the entire inside cylindrical wall thereof.

One end of housing 120 is open, while the opposed end is closed, terminating in a threaded nipple 122 and inlet port 123. Nipple 122 is constructed to assure that a connector extending from the pressure source to be monitored can be quickly and easily securely threadedly engaged therewith.

In addition, pressure sensor 20 of this embodiment incorporates a substantially cylindrically shaped hollow container 125 which incorporates a threaded portion 126 peripherally surrounding the outer cylindrical wall of container 125 and dimensioned for mating, threaded interengagement with housing 120. In addition, a locking ring 127 is also threadedly engaged with thread means 126 and dimensioned for abuttingly engaging the terminating edge of the open end of housing 120, to securely maintain container 125 in locked interengagement with housing 120 in a preselected, desired position.

Substantially cylindrically shaped container 125 is preferably constructed with one open end, having its inner wall partially threaded. The opposed end of container 125 terminates in a substantially closed end 130, with an axial disposed upstanding boss 131 extending therefrom and incor porating a threaded outer peripheral surface. In addition, boss 131 and end 130 incorporate an axially aligned channel 132 through which indicator 23 extends and axially moves through in order to provide the desired visual indication when a fault condition has been sensed.

Pressure sensor 20 also preferably incorporates a removable dome assembly 133 which comprises, in this embodiment, a ring 134 which is threadedly engageable with boss 131 and a flexible, transparent, rubber dome 135 which allows for the desired viewing of the position of indicator 23. In the preferred embodiment, rubber dome 135 comprises flexible silicone rubber which allows both the desired visibility of indicator 23, while also having the requisite flexibility and deformability for allowing the easy movement of indicator 23 from its second, fully extended, indicating position to its first, latched position.

In this embodiment, the cooperating, controlled, interconnecting latched engagement of indicator 23 with latch means 25 is provided in substantially the same manner as detailed above. As shown in FIG. 7, indicator 23 incorporates a tapered flange 41 having a ledge 43 which is in secure, locked holding engagement with ledge engaging shoulders 50 of finger members 48.

As detailed above, any number of finger members 48 can be employed in accordance with the teaching of the present invention. However, it has been found that an octandrious array of finger members 48 peripherally surrounding and engaging ledge 43 of indicator 23 provides the most desirable and effective construction. In addition, each of the plurality of finger members 48 incorporates a cam follower ramp surface 55 to controllably impart the outward, biasing deflection of finger members 48 when the pre-set threshold level is exceeded.

In this embodiment, the octandrious fingers 48 forming latch means 25 extend substantially perpendicularly from a substantially flat cylindrically-shaped plate 140 which incorporates a threaded peripheral edge. Preferably, plate 140 is threadedly engaged with the open end of housing 125, with spring means 124 biasingly engaged between indicator 23 and plate 140.

In this way, indicator 23 resists the force exerted thereon by spring 24 when flange 41 is in locked interengagement with latch means 25, maintaining rod 40 of indicator 23 in its first, monitoring position, with only a small portion of rod 40 extending through channel 132 of container 125. However, whenever indicator 23 has been released from latched interengagement with latch means 25, rod 40 of indicator 23 moves axially through channel 132 into its second, fault indicating position, due to the force exerted on indicator 23 by spring means 24, placing the end of rod 40 in close proximity to dome 135 to provide the desired visual indication.

In order to release indicator 23 from latched interengagement with latch means 25 each and every time the desired pressure level is exceeded, actuator 26 must advance toward cam follower ramp surfaces 55 of finger members 48. In this embodiment, the desired movement of actuator 26 is attained by providing housing 120 with a pressure sensitive movable diaphragm 145 securely mounted about its outer peripheral surface with the closed end of housing 120. As depicted in FIG. 7, diaphragm 145 is in direct pressure monitoring communication with inlet portal 123 of pressure connecting nipple 122. In this way, diaphragm 145 constantly monitors the pressure in inlet portal 123, advancing towards the open end of housing 120 in response to increased pressure levels.

In the preferred embodiment, movable diaphragm 145 incorporates an upstanding actuator holding and engaging boss 146 with which the base of actuator 126 overlies and matingly interconnects. The movement of diaphragm 145 and its associated boss 146 causes actuator 26 to move in the same direction. Consequently, whenever the pressure within portal 123 increases, diaphragm 145 advances toward the open end of housing 120, simultaneously causing actuator 26 to move axially toward cam follower ramp surfaces 55 of finger members 48 of latch means 25. When cam surface 53 of actuator 26 advances into contact with ramp surfaces 55, finger members 48 are biasingly deflected outwardly from their latched position, releasing indicator 23 to move into its fault indicating position.

In order to provide pressure sensor 20 of this embodiment with the desired flexibility and threshold level adjustability required for any particular situation, pressure sensor 20 also incorporates a pressure level adjusting spring 147, one end of which engages actuator 26, and a movable plate 148 which is threadedly engaged within housing 120 in contact with the opposed end of spring 147. By positioning plate 148 in the alternate locations within housing 120, the force exerted by spring 147 on actuator 26 is controllably adjusted. This causes actuator 26, as well as movable diaphragm 145 and boss 146, to overcome the preset spring force before actuator 26 axially moves to disengage finger members 48 from latched interengagement with indicator 23.

In this way, any desired pressure level sensitivity can be attained to provide the desired accurate measurement and monitoring of any desired pressure level. By employing this spring pressure adjustment in combination with the adjustability of the position of container 125 within housing 120, an efficient, precision pressure sensor 20 is attained By moving container 125 in housing 120, the relative position between actuator 26 and latch means 25 is directly controlled. As a result, the distance which actuator 26 must travel along finger members 48 before contacting cam follower ramp surfaces 55 thereof is directly adjusted and controlled. In this way, various levels of sensitivity can be quickly and easily attained.

It will thus be seen that the objects set forth, among those made apparent from the preceding description are efficiently attained and, since certain changes may be made in the above constructions without departing from the scope of the invention, it is intended that all matter contained in the above description, and shown in the accompanying drawings, shall be interpreted as illustrative and not in a limiting sense.

It is also believed that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A sensor for monitoring a particular pre-set level and providing a positive indication whenever a particular level has been reached, comprising
   A. indicator means
   (1) movable between a first, retained position and a second, released indicating position, and
   (2) incorporating engaging means for securing the indicator in its first position,
   B. latch means
   (1) positioned in juxtaposed, cooperating retaining engagement with the engaging means of the indicator,
   (2) responsive to actuating means for disengaging from the indicator means, and
   (3) comprising a plurality of upstanding, longitudinally immovable finger members arrayed in a substantially cylindrical shape with each of said finger members comprising substantially identical sizes and shapes, and each of said finger members having identical harmonic frequency characteristics, whereby latch means responsive to frequency induced vibration is attained with all of said finger members simultaneously releasing the indicator means from latch engagement therewith in response to a particular frequency level; and
   C. spring means in biasing engagement with indicator means for controllably moving the indicator means from its first retained position to its second, released position.

2. A pressure sensor for monitoring at least one pressure level while providing a positive indication when a pre-set pressure level threshold has been exceeded, said sensor comprising
   A. indicator means
   (1) movable between a first, retained position and a second, released, indicating position, and
   (2) incorporating engaging means for securing the indicator in its first position;
   B. spring means in biasing engagement with indicator means for controllably moving the indicator means from its first retained position to its second, released position;
   C. latch means
   (1) positioned in juxtaposed, cooperating retaining engagement with the engaging means of the indicator,
   (2) responsive to the movement of an actuator for disengaging the spring loaded indicator means and
   (3) comprising a plurality of resiliently deflectable, longitudinally immovable independent finger members, each of said finger members incorporating
   a. a shoulder portion extending therefrom and latchingly contacting said engaging means of the indicator means for securement thereof, and
   b. cam means formed thereon and positioned along the length thereof, in juxtaposed spaced relationship to the shoulder portion, for responsive cooperation with a movable actuator, whereby the movement of the actuator along said cam means causes the deflection of the finger member out of its normal indicator-engaging position, releasing the indicator means; and
   D. said actuator
   (1) movable in response to changes in the pressure level being monitored, and
   (2) positioned in controlling relationship with said cam means of the latch means for disengaging the latch means from said indicator means in response to the pressure level being monitored exceeding the threshold level, whereby an efficient and reliable pressure sensing and monitoring system is attained which provides a positive indication whenever a pre-set pressure level is exceeded.

3. The sensor defined in claim 2, wherein said plurality of independent finger members are further defined as comprising
   c. eight independent flexible finger members arrayed in a substantially cylindrical shape,
   d. affixed at one end to a support member, and e. each being dimensioned differently from each other, thereby providing a plurality of latching finger members with each having different harmonic frequency characteristics, whereby unwanted simultaneous disengagement of all finge members in response to frequency-induced vibration is eliminated.

4. The sensor defined in claim 3, wherein said actuator is axially movable within said cylindrical array and comprises a cam surface, and said cam means formed on each of the plurality of independent finger members is further defined as comprising a ramp surface extending from the inside surface of the finger member inwardly towards the cylindrically shaped array and positioned in juxtaposed spaced cooperating engaging relationship with the cam surface of the actuator, whereby axial movement of the actuator causes said finger members to be biasingly deflected outwardly when said cam surface of the actuator moves into camming engagement with the ramp surfaces of said finger members.

5. The sensor defined in claim 4, wherein said cam means is further defined as comprising two oppositely sloping, spaced, ramp portions interconnected by a centrally disposed substantially planar zone.

6. The sensor defined in claim 3, wherein said actuator is axially movable within said cylindrical array and comprises a cam surface, and said cam means formed on each of the plurality of independent finger members is further defined as comprising a pair of oppositely sloping ramp surfaces extending from the inside surface of the finger member inwardly towards the cylindrically shaped array, and said ramp surfaces are positioned in juxtaposed, spaced, cooperating, relationship with the cam means of the actuator, with one of said ramp surfaces longitudinally extending from the cam means of the actuator in one axial direction and the other ramp surface extending from the cam means of the actuator in the opposite axial direction, whereby movement of said actuator in either of its two longitudinal directions causes said finger members to be biasingly deflected outwardly when the actuator moves into camming engagement with the ramp surface of said cam means of said finger members.

7. The sensor defined in claim 6, wherein each of said oppositely sloping ramp surfaces of each finger member is further defined as being interconnected with a substantially flat, planar zone.

8. The sensor defined in claim 2, wherein said engaging means of said indicator means is further defined as comprising a ledge extending from the indicator means adjacent one end thereof, positioned for secure locking interengagement with the shoulder portion of the latch means.

9. The pressure sensor defined in claim 8, wherein said indicator means is further defined as being manually resettable by moving the indicator means against the spring means in biasing engagement therewith, causing said indicator means to be moved from its second, released, indicating position to its first, retained position with the ledge thereof secured in locked interengagement with the shoulder portion of the latch means, placing the spring means in compression ready for movement of the indicator means from its first secured retained position to the second, release indicating position.

10. The sensor defined in claim 9, further comprising
E. a dome assembly comprising (1) a transparent pressure and temperature resistant transparent dome portion securely mounted to a supporting plate, and
(2) spring means in biasing engagement with the dome supporting plate,
(3) said dome assembly being axially aligned and peripherally surrounding the indicator means, whereby said indicator means is readily visible when in its second, indicating position and quickly and easily reset into its first, retained position by manually pressing the dome portion against the biasing spring, moving said dome portion and said indicator means simultaneously until said indicator means is in its first retained position.

11. The sensor defined in claim 9, wherein said sensor further comprises
E. a dome assembly
(1) incorporating a transparent dome-shaped rubber member,
(2) mounted about the indicating means in peripherally surrounding, aligned relationship with the terminating end thereof, whereby said indicator means is readily visible through said dome-shaped member when said indicator means is in its second, released indicating position, and
(3) said dome-shaped member being flexible and compressible, allowing manual movement of said dome-shaped member and said indicator to cause the indicator to be manually moved from its second, released position to its first, retained position.

12. The sensor defined in claim 2, further comprising
E. a housing comprising
(1) a pressure sampling zone, and
(2) a pressure interconnecting portal communicating with the pressure sampling zone; and
F. a pressure responsive diaphragm
(1) mounted within the pressure sampling zone,
(2) laterally movable therein in response to changes in pressure level within said zone, and
(3) controllingly engaged with the actuator for moving said actuator in response to pressure changes.

13. The sensor defined in claim 12, wherein said latch means is further defined as comprising a plurality of resiliently deflectable, independent finger members, arrayed in a cylindrical shape each incorporating
a. a shoulder portion extending therefrom and latchingly contacting said engaging means of the indicator means for securement thereof, and
b. cam means responsively cooperating with the actuator for deflecting the finger member out of its normal indicator-engaging position when the preset level has been attained, thereby releasing the indicator means, and said actuator is further defined as comprising
(3) an elongated arm portion
a. axially movable relative to the latch means within the substantially cylindrically shaped finger members,
b. with one terminating end thereof incorporating a camming surface positioned in juxtaposed, spaced controlling engagement with the cam means of said latch means for disengaging the latch means from said indicator means in response to axial movement of said arm portion from the pressure induced movement of said diaphragm.

14. The sensor defined in claim 13, wherein said housing comprises a high pressure portal communicating with the pressure sampling zone of a first surface of the diaphragm mounted thereon and a low pressure portal communicating with the pressure sampling zone and the second surface of the diaphragm, and said diaphragm is further defined as     (4) mounted along said arm portion of the actuator radially extending outwardly therefrom, and     (5) movable in response to changes in both the high and low pressure sources, and the differential pressure created thereby.

15. The sensor defined in claim 2, further comprising

E. pressure level adjustment means cooperatingly associated with the actuator for manually altering the pressure level required to move said actuator, thereby providing a pressure sensing and monitoring system which is activated at any desired pre-set pressure threshold level.

16. The sensor defined in claim 15, wherein said pressure level adjustment means comprises a spring member in biasing engagement with said actuator and an adjustment member controllably movable relative to said actuator for precisely changing the spring force acting upon the actuator, causing the actuator to overcome the spring force before being able to move, thereby controlling the actuator movement to a particular, pre-set, desired pressure level.

17. The sensor defined in claim 2, wherein said sensor further comprises

E. switch means

(1) positioned in juxtaposed spaced aligned relationship with said indicator means,     (2) communicating with a remote station to provide the status of said sensor, and     (3) incorporating an indicator position sensor in juxtaposed, spaced aligned relationship with said indicator means, said sensor being in the OFF position when the indicator means is in its first, retained position and is in the ON position when said indicator means moves into its second, released indicating position, thereby providing the desired signal at the remote station 18. The sensor defined in claim 17, wherein the indicator means comprises a radially extending flange secured thereto and said sensor of the switch means comprises a movable arm mounted between the flange of the indicator means and the switch means, causing the switch to be moved into its ON position when the flange moves with the indicator means into its second position.

19. A pressure sensor for monitoring at least one pressure level while providing a positive indication when a pre-set pressure level threshold has been exceeded, said sensor comprising A. indicator means     (1) movable between a first, retained position and a second, released, indicating position, and     (2) incorporating engaging means for securing the indicator in its first position;

B. spring means in biasing engagement with indicator means for controllably moving the indicator means from its first retained position to its second, released position;

C. latch means

(1) positioned in juxtaposed, cooperating retaining engagement with the engaging means of the indicator,     (2) responsive to the movement of an actuator for disengaging the spring loaded indicator means, and     (3) comprising a plurality of resiliently deflectable, longitudinally immovable independent finger members arrayed in a substantially cylindrical shape, with one end of each finger member affixed to a common support, each of said finger members incorporating along its inside surface, which faces inwardly towards the cylindrically shaped array,         a. a shoulder portion extending therefrom and latchingly contacting said engaging means of the indicator means for securement thereof, and         b. cam means formed thereon and positioned along the length thereof, in juxtaposed spaced relationship to the shoulder portion, for responsive cooperation with a movable elongated actuator, whereby the movement of the actuator along said cam means causes the deflection of the finger member out of its normal indicator-engaging position, releasing the indicator means; and D. said elongated actuator     (1) longitudinally movable within the cylindrical array of finger members in response to changes in the pressure level being monitored,     (2) positioned with the central axis thereof in substantial co-axial alignment with the central axis of the cylinder formed by the plurality of finger members, and     (3) one end thereof comprising a cam surface positioned in controlling relationship with said cam means of the finger members for simultaneously deflecting the finger members outwardly, out of their normal indicator-engaging position, in response to the pressure level being monitored exceeding the threshold level;

E. a housing comprising

(1) a pressure sampling zone, and

(2) a pressure interconnecting portal communicating with the pressure sampling zone; and F. a pressure responsive diaphragm     (1) mounted within the pressure sampling zone,     (2) laterally movable therein in response to changes in pressure level within said zone, and     (3) controllingly engaged with the opposed end of the actuator for moving said actuator in response to pressure changes.

* * * * *